(12) United States Patent
Morrison et al.

(10) Patent No.: US 6,275,053 B1
(45) Date of Patent: Aug. 14, 2001

(54) TOUCH PROBE

(75) Inventors: Robert B Morrison, Pliezhausen (DE); Peter K Hellier, North Nibley (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/332,498

(22) Filed: Jun. 14, 1999

(30) Foreign Application Priority Data

Jun. 20, 1998 (GB) .................................................. 9813263

(51) Int. Cl.$^7$ .......................... G01R 31/02; G01R 31/26; G01R 1/04; G01R 5/00
(52) U.S. Cl. ...................... 324/754; 324/158.1; 324/756; 324/765; 33/556
(58) Field of Search ................................ 324/754; 33/556, 33/503, 756, 757, 758, 761, 763, 765, 158.1

(56) References Cited

U.S. PATENT DOCUMENTS

| | | |
|---|---|---|
| 3,883,942 | 5/1975 | Fichter, Jr. et al. . |
| 4,136,458 | 1/1979 | Bell et al. . |
| 4,153,998 * | 5/1979 | McMurtry ................................ 33/556 |
| 5,778,552 | 7/1998 | LeGuin . |
| 5,848,477 * | 12/1998 | Wiedmann et al. ................... 33/503 |

FOREIGN PATENT DOCUMENTS

| | | |
|---|---|---|
| 94 11 566 U | 11/1994 | (DE) . |
| 195 16 272 | 11/1996 | (DE) . |
| 0 269 795 | 6/1988 | (EP) . |
| 2 317 055 | 3/1998 | (GB) . |
| WO 91/14149 | 9/1991 | (WO) . |

* cited by examiner

*Primary Examiner*—Safet Metjahic
*Assistant Examiner*—Anjan K Deb
(74) *Attorney, Agent, or Firm*—Oliff & Berridge, PLC

(57) ABSTRACT

A touch probe has a stylus holder 16 which is supported on a radially extending flange 14 in a kinematic seat comprising pairs of balls 20 supporting rollers 24. To avoid the use of glue to fix the balls in position, the balls are located and clamped in recesses 22 on flange 14. Clamping pressure is provided by a plug 30 which is forced towards the flange by rolling a lip 54 over the protruding end of the plug. Other alternative constructions for providing the clamping force are described. An electrical circuit through the balls for producing a trigger signal includes a flexible member 40 on which electrical conducting elements 44 are formed. The member is positioned on the flange to overlie the recesses so that it is deformed into the recesses when the clamping force is applied. By making use of the clamping force in this way good electrical connections between the balls and the conducting elements is ensured and the need to connect wires to the balls is avoided.

8 Claims, 3 Drawing Sheets

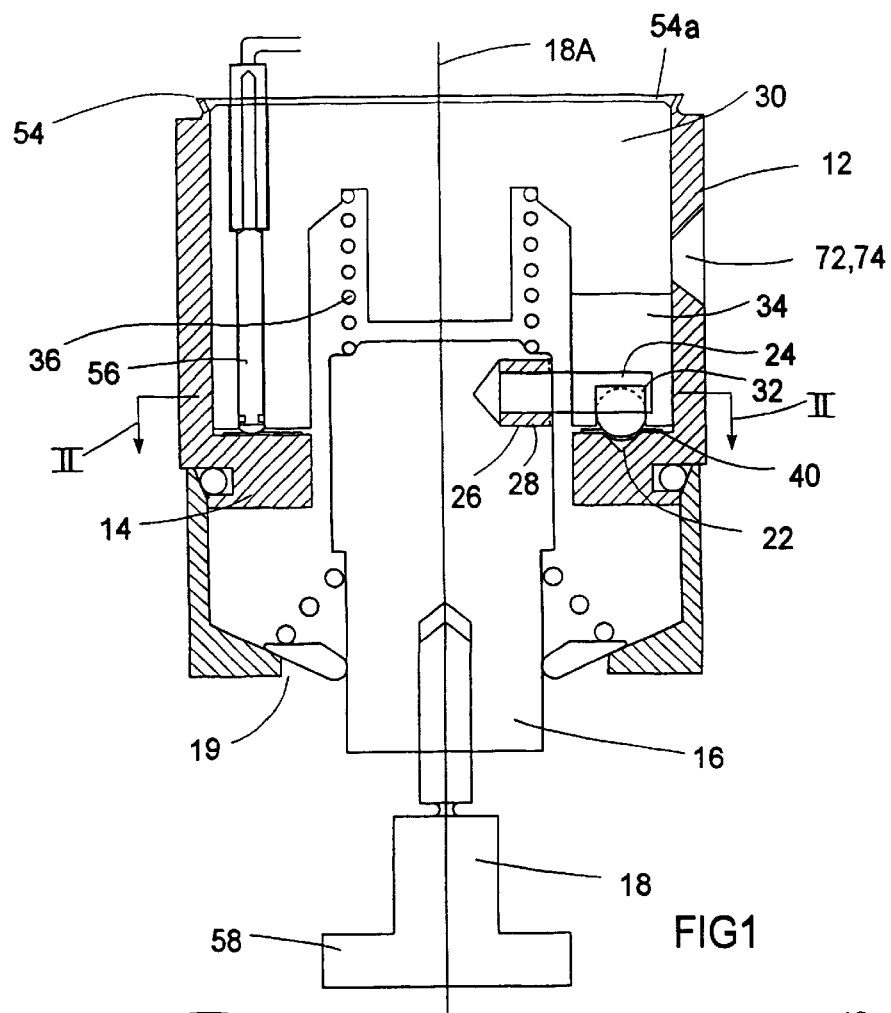
FIG1
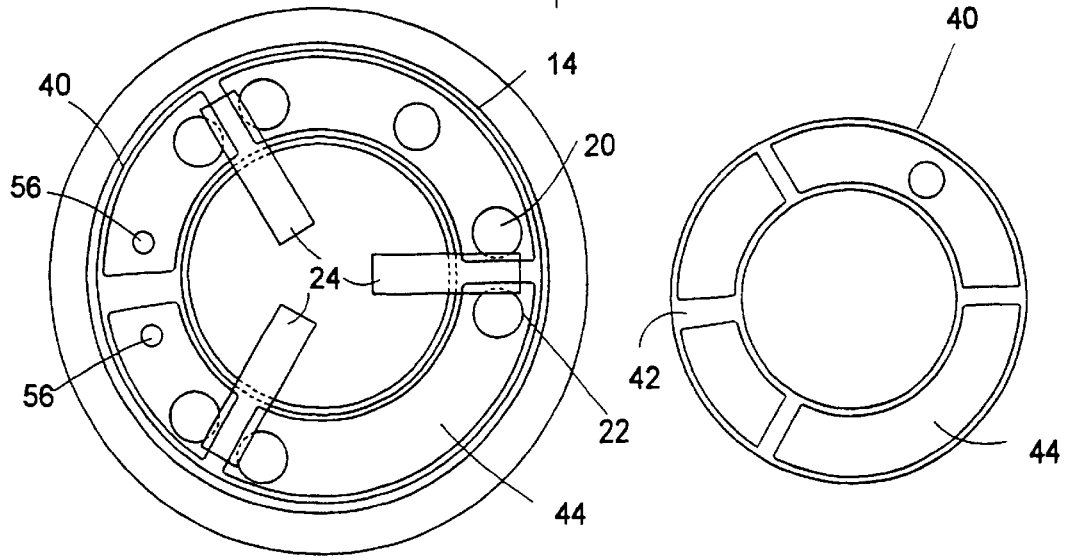
FIG2
FIG3

TOUCH PROBE

The present invention relates to touch probes of the type having a stylus which is mounted in a seat within the probe and is biased into the seat by a spring. The probe is mountable on the arm of a machine and movable towards a workpiece in order to drive the stylus into contact with the workpiece. Upon contact with the workpiece the stylus is deflected from its seat against the action of the bias means and this movement generates a signal which is passed to the machine so that the machine can record the instantaneous position of the arm of the machine on which the probe is mounted at the moment that the signal arrives.

One form of such touch probe is known from our U.S. Pat. No. 4,153,998, which describes, inter alia, a probe in which the stylus is screwed into a stylus holder, and the stylus holder is supported in a kinematic seat by three radially extending arms spaced at 120° around the axis of the stylus. The kinematic seat is provided by the vee notches defined between a pair of closely spaced balls which are glued into sockets on the housing of the probe in such a way that the glue forms an insulating barrier between the balls and the housing. The balls are wired in series in an electrical circuit which is only completed when all three arms are seated in the vee notches defined by the balls, thus bridging the gaps between the balls.

The gluing of the balls into the sockets and the wiring of the individual balls in the electrical circuit are time consuming operations which add to the cost of the probe, and can give rise to other problems. For example, the presence of the glue can give rise to inaccuracies during operation of the probe if there are any significant temperature changes. Also the wiring can be a source of failure of the probe as individual wires can become broken or dislodged from the balls in use.

The present invention seeks to remedy one or more of these defects in a probe.

Figure 4:
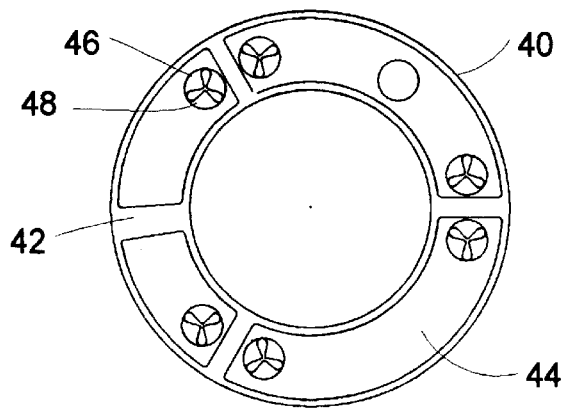
Figure 6:
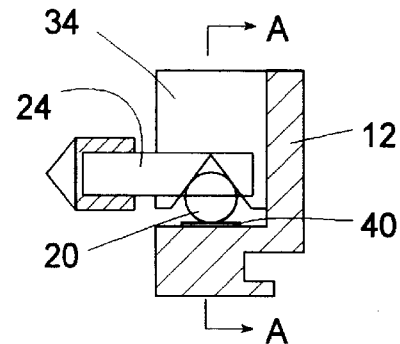
Figure 7:
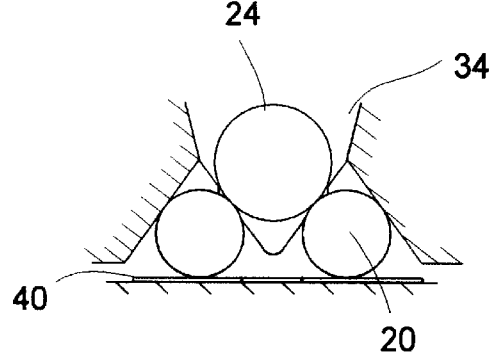
Figure 5:
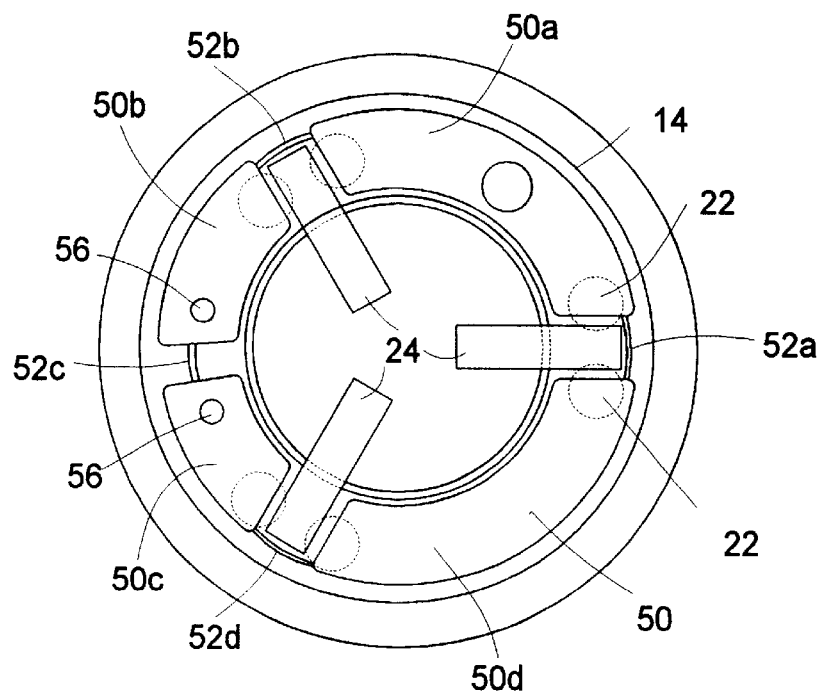
Figure 8:
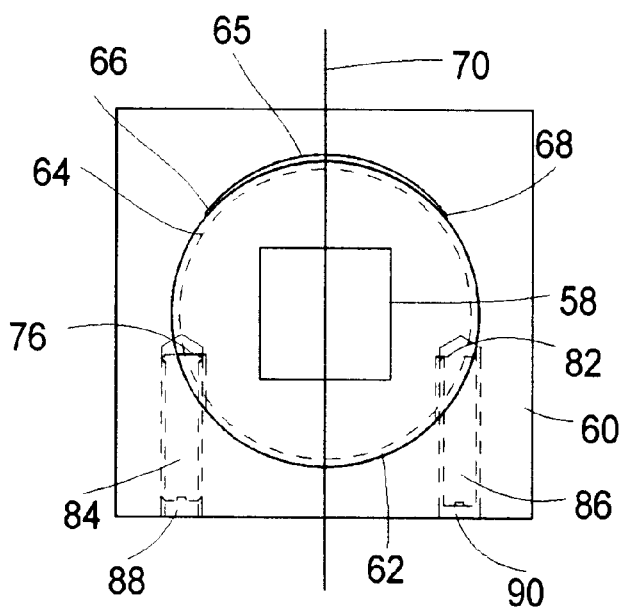
Figure 9:
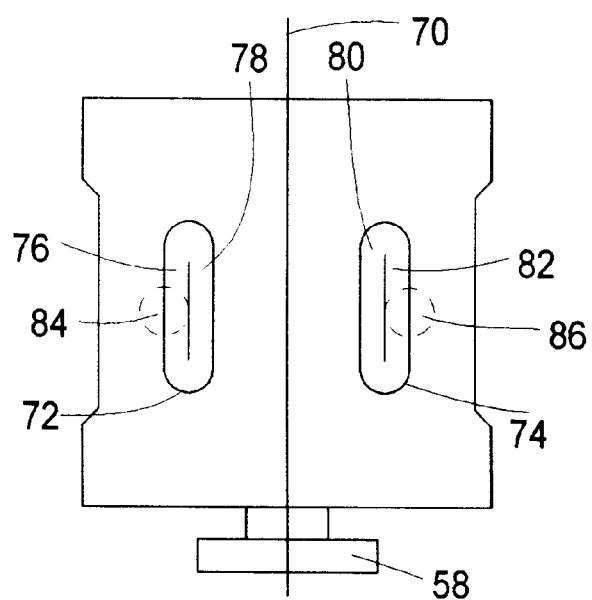

Examples of probes according to the present invention will now be described with reference to the accompanying drawings in which:

FIG. 1 is a cross-sectional elevation through one embodiment of a probe in accordance with the present invention, FIG. 2 is a cross-section on the line II—II of FIG. 1, of an assembled probe, FIG. 3 is a plan view of a flexible conducting element for use within the probe, FIG. 4 is a plan view of an alternative form of conducting element, FIG. 5 is a view similar to FIG. 2 of a probe incorporating an alternative form of flexible conducting element, FIG. 6 is a part-sectional elevation of a probe featuring a further embodiment of the invention, FIG. 7 is a view on the line A—A of FIG. 6, FIG. 8 is a plan view of a probe of the present invention assembled in a tool setting arm, and FIG. 9 is a side elevation of the probe shown in FIG. 6.

Referring now to FIGS. 1 and 2 of the drawings, the probe has an outer housing 12, preferably made of steel, and which has a radially inwardly directed annular flange 14. Mounted within the housing is a stylus holder 16 to which is connected an elongate stylus 18 having an axis 18A which is coincident with the longitudinal axis of the housing.

The stylus and part of the stylus holder protrude from the housing in the direction of the axis 18A though an opening 19 at one end of the housing, so as to be able to contact or be contacted by a workpiece or tool when relative movement takes place between the probe and the workpiece or tool.

Six recesses 22 are formed in the flange 14 and are open in the direction facing away from the opening 19. The recesses are arranged in pairs, and the pairs are spaced apart at 120° around the axis 18A. The recesses are adapted to receive seating elements shown in this example as balls 20, and may be of any convenient shape for example conical or triangular, whereby when the ball is received in the recess it remains in a stable position and is kinematically supported. The spacing of the balls within each pair is such that they may be bridged by, and form a stable seating for, a roller 24 carried by the stylus holder 16.

The rollers 24 are fitted in holes 26 in the stylus holder spaced at 120° around the axis 18A, and the holes are initially lined with a plastic insert 28, which may be split along its length, and into which the rollers are pressed.

The balls are both located and clamped into their respective recesses by means of an open-ended cylindrical plug 30 made out of hard plastic. In the annular surface at its open end, the plug has six appropriately spaced recesses 32, which in the assembled probe, fit over the balls. Also, at its open end, the plug 30 is formed with three elongate slots 34 which act as guides for the rollers 24 as the stylus holder tilts and is moved vertically by forces acting on the end of the stylus.

The stylus holder is biased into a neutral position, when no force is applied to the stylus, by means of a spring 36 which produces a force in the direction of the axis 18A to urge the rollers into the seats formed between the balls 20.

In order to enable the probe to produce a signal when the stylus is deflected either by tilting or vertical movement, the balls are electrically connected in series to form a circuit which is completed by the rollers making contact with both balls in each pair.

The balls are made from a hard electrically conducting material, for example steel or tungsten carbide, and they must therefore be insulated from the steel body where they make contact with the steel body in the recesses 22.

The insulation of the balls from the body, and the serial interconnection of the balls into an electrical circuit are achieved in a novel way in accordance with one embodiment of the invention by the use of a thin flexible electrically conductive element 40 made in two layers. One of the layers 42 is formed from an insulating material, and the other layer 44 is part-annular and is formed from an electrically conductive material. Many combinations of material would be suitable for the flexible element but in the preferred embodiment described herein, the element is made of thin plastic 42 with a thin coating 44 of copper on one side to form the part-annular electrically conducting areas, as shown in FIG. 3.

During assembly of the probe, the annular thin element is positioned on the annular flange 14 with its insulating side in contact with the flange, and with the conducting areas positioned over the recesses 22. The balls are received in the recesses 32 in the plug, and the plug is then pressed into position by exerting a clamping force on the opposite end of the plug.

The clamping force on the balls deforms the areas of the flexible member 40 which lie under the balls into the recesses 22 and provides for good electrical contact at the balls as well as a stable seating of the balls. To assist the stability of the seating of the balls on the member 40 in the recesses, the flexible member may be provided with six shaped cut-outs 46 which provide three flaps 49 (shown in FIG. 4) which fold into the recesses under the clamping pressure, ensuring that each ball rests on three points within each recess.

The invention is not limited to the embodiment described with reference to FIGS. 1 to 4. In another embodiment the body part 12 or at least the flange 14 thereof, is made from aluminium which is then anodised to form an insulating layer on which a thin sheet made of any suitable electrically conducting material can rest or be deposited directly. Alternatively, the body part 12, or at least the flange 14 thereof, may be made from a relatively rigid, non-conducting plastic or ceramic material. With these alternatives it is also possible to arrange that the thin part-annular conducting member lies on top of the balls, the stable positioning of the balls and the required electrical contact force being maintained by the clamping force. In such an embodiment sufficient areas of the balls will need to be exposed so that the rollers 24 can make electrical contact therewith.

An example of this arrangement is shown in FIG. 5 in which, using the same reference numerals for parts identical with those of earlier figures, the flexible metal element 50 is shown in four main pieces 50a,50b,50c and 50d joined by four insulating connectors 52a,52b,52c,52d, which by-pass the ends of the rollers 24. The metal element 50 is positioned on top of the balls 22 and is pressed into good electrical contact with them by the clamping plug 30.

The clamping force may be exerted in various ways but in the preferred embodiment a lip 54 on the end of the housing is rolled over to a position shown at 54A in contact with the top perimeter of the plug 30 to force the plug downwardly into the probe housing.

The clamping force may, alternatively be provided, for example, by a threaded end cap, which screws onto the body to exert pressure on the plug 30, by a spring force supplied by a spring between the plug and an end wall of the housing, or by mounting an end plate onto the housing by means of screws to compress the plug.

In order to complete the electrical circuit to the outside of the probe, two contact pins 56 are pressed through the hard plastic plug 30 and their conducting ends are pressed into contact with opposite ends of the metallic conducting element.

FIGS. 6 and 7 show a further embodiment of the invention in which the accurate location of the balls 20 achieved by shaping the recesses 32 in the member 30. For example, as shown in FIG. 6, the recesses may be conical whereby when the clamping force is applied each ball becomes accurately and repeatably located.

Part of each ball surface protrudes into the slot 34 in member 30 in which the rollers 24 are loosely guided, whereby the rollers are movable during operation of the probe to seat on, and unseat from, the surfaces of the balls. In this embodiment the electrically conductive element needs only to be sufficiently deformable under the clamping pressure to ensure good electrical contact with the balls, and the surface of the flange to which it is applied is non-conducting.

Once again therefore the clamping force provides for the accurate location of the balls, without gluing and for good electrical contact between the conducting element and the balls without requiring wires.

The conductive element may take many forms and need not be required to deform as is shown in FIGS. 1 to 4. For example, in the FIG. 5 embodiment and the FIG. 6 embodiment there is no requirement for the conductive element to deform into ball-recesses, and it can thus be made thicker and less flexible. Other forms of conducting element may therefore include a simple metallic strip, with cut-outs to prevent shorting between the balls 22 and with or without an insulating layer, depending on whether or not it is in contact with an insulated part of the probe assembly.

Although the seating elements and support elements are shown respectively as balls 20 and rollers 24, other known combinations of balls or rollers could be used instead.

Although the assembly method described above can be used to construct probes for any purpose, the present preferred embodiment is particularly concerned with a toolsetting probe. In such a probe as shown in FIGS. 6 and 7 the stylus has a square tip 58 screwed into the free end thereof. The probe is adapted to be mounted into a toolsetting arm 60.

Referring now to FIGS. 6 and 7. The probe is pressed into a bore 62 in the end of the arm, and abuts against an end flange 64 in the bore. The bore 62 is shaped to provide two surfaces 66,68 on opposite sides of a diametral line 70, which are contacted by the probe body to provide a lateral support. The surfaces may be formed in any convenient manner and may be flat surfaces formed as sides of a vee-groove, or, as shown in the preferred embodiment of FIG. 6, are edges formed as a result of cutting out a profiled section 65 from the wall of the bore. The surfaces 66,68 extend substantially the full length of the bore to prevent tipping of the probe during adjustment of the probe tip as will be described below.

The external surface of the probe is provided with two vee-notches 72,74 which have side surfaces 76,78,80 and 82 approximately at right angles. The vee-notches are provided symmetrically on opposite sides of the diametral line 70 and each has one of its surfaces, 76 and 82 respectively, aligned in a plane normal to the diametral line 70.

A pair of flat ended grub screws 84,86 are provided which screw into threaded holes 88,90 in the body of the arm 60 such that their flat ends can be brought into contact with the surfaces 76 and 82 of the vee-notches 72,74.

When the probe is assembled with the arm on a machine, it is initially positioned with the sides of the square tip 58 of the stylus aligned as nearly at possible with the x and y axes of the machine, by aligning marks on the probe body with marks on the arm. A fine adjustment is then made using a dial gauge indicator attached to the machine, by screwing the grub screws 84,86 onto one or other of the flat faces 76 and 82 which will rotate the probe about its longitudinal axis 18A in either direction to align the stylus tip with the machine axes. During this rotation the probe body slides on the surfaces 66,68 without tipping.

When the dial gauge shows that the alignment of the stylus tip is correct, both of the grub screws are tightened down to lock the probe in position against the surfaces 66,68.

What is claimed is:

1. A touch probe including:

a stylus holder to which a workpiece-contacting stylus is connectable, seating elements within the probe, support elements on the stylus holder which co-operate with the seating elements to locate the stylus holder within the probe, an electrical circuit which includes the seating elements, which is completed when the support elements are in electrical contact with all of the seating elements, and which is broken when one of the support elements loses electrical contact with one of the seating elements, the probe further comprising at least one flexible electrical conducting strip forming part of the electrical circuit and positioned in contact with the seating elements, and a clamp which applies clamping force to clamp the seating elements in position and to urge the seating elements and the at least one electrical conducting strip into electrical contact with each other.

2. A touch probe according to claim 1 wherein the probe has a housing and a flange extending inwardly therefrom, the seating elements and support elements co-operating to locate the stylus holder on the flange, the clamp comprising a plug which is forced towards the flange.

3. A touch probe according to claim 2 wherein the flange has an electrically conducting surface, and each electrically conducting strip comprises a part-annular metallic strip formed on an insulating backing layer positioned on the flange with the backing layer in contact with the electrically conducting surface of the flange.

4. A touch probe according to claim 2 wherein the flange has an electrically non-conducting surface and each electrically conducting strip comprises a part-annular metallic strip applied to the electrically non-conducting surface of the flange.

5. A touch probe according to claim 3 wherein the seating elements are made from an electrically conducting material, the electrically conducting surface of the flange is provided with recesses for locating the seating elements, each electrically conducting strip is positioned to overlie the recesses and is deformed by the seating elements into the recesses when the clamping force is applied by the clamp.

6. A touch probe according to claim 4 wherein the seating elements are made from an electrically conducting material, and the electrically non-conducting surface of the flange is formed with recesses for locating the seating elements, each electrically conducting strip comprises a part annular metallic strip formed in sections joined by non-conducting connectors and positioned so that they at least partially overlie the seating elements.

7. A touch probe according to claim 2, wherein the seating elements are made from an electrically conducting material, the plug is made from an electrically non-conducting material and is provided with recesses for locating the seating elements, the flange has an electrically non-conducting surface, and the electrically conducting strip comprises a part-annular metallic strip applied to the surface of the flange.

8. A touch probe according to claim 2 wherein the clamping pressure on the plug is provided by a lip on the end of the housing which is rolled over to force the plug towards the flange.

* * * * *